United States Patent
Satou et al.

(10) Patent No.: US 7,632,594 B2
(45) Date of Patent: Dec. 15, 2009

(54) SOLID OXIDE FUEL CELL WITH IMPROVED GAS EXHAUST

(75) Inventors: Fuminori Satou, Yokohama (JP); Yasushi Nakajima, Kawasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 90 days.

(21) Appl. No.: 10/581,345

(22) PCT Filed: Nov. 25, 2004

(86) PCT No.: PCT/JP2004/017901

§ 371 (c)(1), (2), (4) Date: Jun. 2, 2006

(87) PCT Pub. No.: WO2005/055350

PCT Pub. Date: Jun. 16, 2005

(65) Prior Publication Data

US 2007/0111067 A1    May 17, 2007

(30) Foreign Application Priority Data

Dec. 2, 2003  (JP) ............................ P2003-403182

(51) Int. Cl.
*H01M 2/14* (2006.01)
*H01M 2/00* (2006.01)
*H01M 8/00* (2006.01)

(52) U.S. Cl. ............................ 429/38; 429/34; 429/12; 429/39

(58) Field of Classification Search .................. 429/53, 429/61–66, 82, 94
See application file for complete search history.

(56) References Cited

U.S. PATENT DOCUMENTS 5,460,897 A * 10/1995 Gibson et al. ............... 429/39

(Continued)

FOREIGN PATENT DOCUMENTS

DE    100 33 898 A1    1/2002

(Continued)

OTHER PUBLICATIONS

M. Wilson et al., "Alternative Flow-Field and Backing Concepts for Polymer Electrolyte Membrane Fuel Cells," Extended Abstracts, Electrochemical Society, vol. 95/2, Jan. 1995, pp. 1043 and 1044.

*Primary Examiner*—Dah-Wei D Yuan
*Assistant Examiner*—Zachary Best
(74) *Attorney, Agent, or Firm*—Foley & Lardner LLP

(57) ABSTRACT

A solid oxide fuel cell includes a plurality of electric power-generating elements stacked in a stack direction, each including a solid oxide electrolyte and a porous electrode section. A plurality of first current collector layers are connected to the porous electrode sections, respectively. At least one separator is provided for separating the plurality of electric power-generating elements. A gas supply channel is defined between the at least one separator and is associated with one of the plurality of first current collector layers. A plurality of gas supply branch passages branch off from the gas supply channel and reach the electrode section of the associated one of the plurality of electric power-generating elements. The fuel cell further includes a plurality of gas exhaust channels for exhausting consumed gas via the associated one of the plurality of first current collector layers.

18 Claims, 10 Drawing Sheets

U.S. PATENT DOCUMENTS

| | | |
|---|---|---|
| 5,641,586 A | 6/1997 | Wilson |
| 5,770,327 A * | 6/1998 | Barnett et al. ............. 429/34 |
| 5,846,668 A | 12/1998 | Watanabe |
| 5,856,035 A * | 1/1999 | Khandkar et al. ........... 429/34 |
| 5,922,485 A * | 7/1999 | Enami ......................... 429/26 |
| 5,932,368 A * | 8/1999 | Batawi et al. ............... 429/30 |
| 6,146,780 A | 11/2000 | Cisar et al. |
| 6,207,312 B1 * | 3/2001 | Wynne et al. ............... 429/34 |
| 6,224,993 B1 * | 5/2001 | Hartvigsen et al. ......... 429/30 |
| 6,274,258 B1 * | 8/2001 | Chen ........................... 429/13 |
| 6,649,296 B1 * | 11/2003 | Minh ........................... 429/34 |
| 7,517,605 B2 * | 4/2009 | Komada et al. .............. 429/34 |
| 2002/0025458 A1 * | 2/2002 | Faville et al. ................ 429/13 |
| 2002/0081475 A1 * | 6/2002 | Simpkins et al. ............ 429/30 |
| 2002/0086200 A1 | 7/2002 | Margiott |
| 2003/0008194 A1 * | 1/2003 | Cargneli et al. ............. 429/39 |
| 2003/0012995 A1 | 1/2003 | Hara et al. |
| 2003/0134174 A1 * | 7/2003 | Akikusa et al. ............. 429/38 |
| 2003/0219639 A1 * | 11/2003 | Edlund ........................ 429/32 |
| 2005/0016729 A1 * | 1/2005 | Savage ........................ 166/302 |

FOREIGN PATENT DOCUMENTS

| | | |
|---|---|---|
| DE | 100 38 589 A1 | 2/2002 |
| EP | 1 447 869 A1 | 8/2004 |
| JP | 60-227361 A | 11/1985 |
| JP | 61-260555 A | 11/1986 |
| JP | 01-167959 A | 7/1989 |
| JP | 02-126562 A | 5/1990 |
| JP | 05-013051 U | 2/1993 |
| JP | 7-029579 A | 1/1995 |
| JP | 11-016591 A | 1/1999 |
| JP | 2000-003715 A | 1/2000 |
| JP | 2002-203579 A | 7/2002 |
| WO | WO 94/11912 A1 | 5/1994 |
| WO | WO 02/45198 A2 * | 6/2002 |

* cited by examiner

SOLID OXIDE FUEL CELL WITH IMPROVED GAS EXHAUST

TECHNICAL FIELD

The present invention relates to solid oxide fuel cells and, more particularly, to a solid oxide fuel cell that aims to alleviate internal thermal stress.

BACKGROUND ART

In general, a fuel cell is an electrochemical device in which electrochemical reaction takes place between fuel gas, such as gas containing hydrogen, and oxidizer gas, such as air containing oxygen, in an electrolyte layer to directly extract electric energy. Depending on a kind of electrolytes, the fuel cell is typically classified into Phosphoric Acid Fuel Cell (PAFC), Molten Carbonate Fuel Cell (MCFC), Solid Oxide Fuel Cell (SOFC) and Polymer Electrolyte Fuel Cell (PEFC).

Among these, due to various reasons, such as an ease of handling because of the use of an electrolyte composed of a solid oxide with an oxygen ion conductivity, high electric power generating efficiency, waste heat at high temperatures and fuel gases available in a wide range, the solid oxide fuel cell receives expectations to be applied to power supplies for moving objects and on-site cogeneration systems.

Such a solid oxide fuel cell is classified into a cylindrical structure type and a flat-structure type on structural features. The cylindrical structure type includes a cylindrical electrolyte whose inner and outer surfaces are formed with electrodes, respectively. The flat-structure type includes a rectangular or circular flat-shaped electrolyte whose both surfaces are formed with electrodes, having a greater potential than the cylindrical structure type in a capability of obtaining a high-power-density configuration.

Further, in such a flat-structure type fuel cell, flat-shaped electric power-generating elements, each including an electrolyte layer with both surfaces laminated with a fuel electrode layer and an air electrode layer, and separators, doubling as interconnectors, each having one surface formed with fuel gas flow channels and the other surface formed with air flow channels, are alternately stacked, upon which a stack structure is applied with a large load in a stack direction to ensure gas sealing effects and electrical connections.

In addition, proposals have heretofore been made to provide an electrode support type structure wherein when forming the electrolyte layer in a thin film configuration in order to reduce electric resistance, either a porous fuel electrode or a porous air electrode is used as a support body on which an electrolyte layer and the other electrode layer are formed.

By the way, with the fuel cell, chemical energy resulting from oxidation of fuel gas is extracted as electric energy and remaining energy is consumed as heat. Also, Joule heat occurs due to internal resistance of the cell resulting from flow of current generated in an electric power generating cell. Since these developed heats occur in proportion to current densities on respective locations, the presence of an imbalance in current density on an electric power generating surface results in an imbalance in temperature on the electric power generating surface.

If the solid oxide fuel cell is comprised of an electric power generating cell composed of ceramics, heat conductivity is low with a resultant difficulty in alleviating an in-plane temperature difference in the electric power generating cell. Additionally, the use of separators made of ceramics causes a whole of the components parts to be structured with ceramics, resulting in a further increase in the in-plane temperature difference. Accordingly, fuel gas and oxidizer gas become expedient measures for cooling the electric power generating cell in which heat builds up due to electric power generation. Among these, oxidizer gas with a large flow rate takes a leading part.

In the meanwhile, on characteristics of the solid oxide fuel cell, the degree of oxygen ion movement increases in areas with high temperatures to result in a decrease in internal resistance and, hence, a fuel gas inlet portion, which originally has a large current density, takes a further increased current density with a resultant further increase in the in-plane temperature difference of the electric power generating cell. This results in a drop in a temperature of the oxidizer gas flow inlet portion to allow the fuel gas inlet portion to have a distribution pattern with increased temperatures, causing strain to occur due to thermal stress.

Japanese Patent Application Laid-Open Publication No. 2002-203579 (see page 9 and FIG. 1) discloses a fuel cell with a structure wherein as a countermeasure to prevent concentration distribution and temperature difference in gases that cause a temperature difference to occur in such an electric power generating surface, gas is preheated and blown out from multiple blowout ports toward a cell.

DISCLOSURE OF INVENTION

However, upon studies conducted by the present inventors, the fuel cell with such a structure tends to suffer from issues where due to the presence of gas that is preheated, a difficulty is encountered in creating a temperature distribution through cooling by the use of blown-out gas. But, on the other hand, a whole of blown-out gas passes across a surface of the cell and exhausted to an outer peripheral area thereof. That is, gas, which is blown out in the vicinity of a central area of the cell and ceases reaction on the cell, results in the mixing with gas that is blown out in the outer peripheral area.

In particular, even in the fuel cell with such a structure, it's still going for gas to have a concentration that is high at the central area and low in the outer peripheral area with a resultant occurrence of thermal stress distribution on the surface. Particularly, in using hydrocarbon fuel, such as methane and dimethylether, several [mol] of reacted gas occurs on the fuel electrode in terms of one [mol] of fuel and, hence, a further increased gas concentration gradient occurs resulting in a tendency with a further increase in thermal stress distribution caused in the electric power generating surface.

The present invention has been completed upon conducting the above studies by the present inventors and, particularly, has an object to provide a solid oxide fuel cell that aims to alleviate internal thermal stress.

According to one aspect of the present invention, a solid oxide fuel cell comprises: a plurality of electric power-generating elements stacked in a stack direction and each including a solid oxide electrolyte and a porous electrode section to which gases are supplied; a plurality of first current collector layers, connected to the electrode sections, respectively, which are porous; at least one separator disposed between at least one pair of adjacent ones among the plurality of electric power-generating elements to electrically connect the at least one pair of adjacent ones to one another such that the plurality of electric power-generating elements are electrically connected in the stack direction; a gas supply flow channel defined between the at least one separator and associated one of the plurality of first current collector layers; a plurality of gas supply branch flow passages branched off from the gas supply flow channel and reaching the electrode section of the associated one of the plurality of electric power-generating elements; and a plurality of gas exhaust flow channels permitting a remnant of gas, provided to the associated one of the plurality of electric power-generating elements via the plurality of gas supply branch flow passages, to be exhausted through the associated one of the first current collector layers.

Other and further features, advantages, and benefits of the present invention will become more apparent from the following description taken in conjunction with the following drawings.

BEST MODE FOR CARRYING OUT THE INVENTION

Figure 1A:
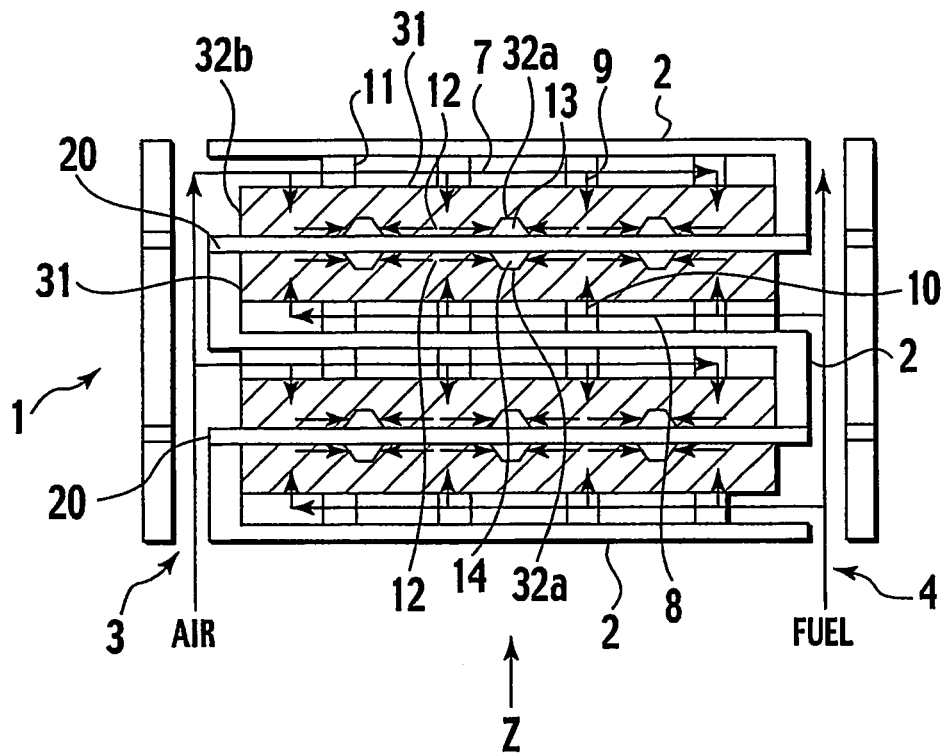
FIG. 1A is a schematic cross-sectional view illustrating a solid oxide fuel cell of a first embodiment according to the present invention.

Hereinafter, solid oxide fuel cells respective embodiments according to the present invention are described in detail with reference to the accompanying drawings. Incidentally, the same component parts of the several embodiments bear like reference numerals to omit or simplify description.

FIRST EMBODIMENT

First, referring to FIGS. 1A to 2E, a solid oxide fuel cell of a first embodiment according the present invention is described below.

Figure 1B:
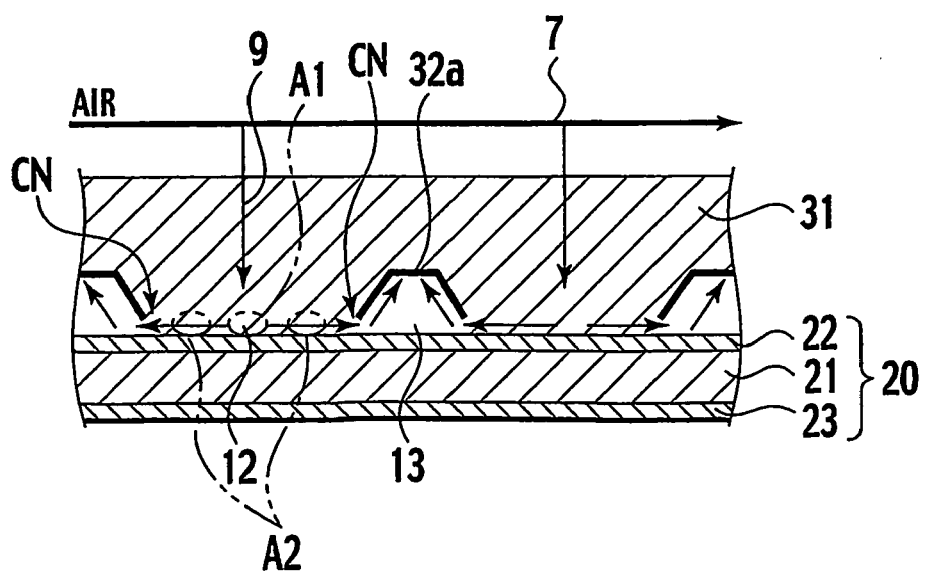
FIG. 1B is a typical view illustrating gas flow on an oxidizer electrode surface of the solid oxide fuel cell of the presently filed embodiment.
Figure 2A:
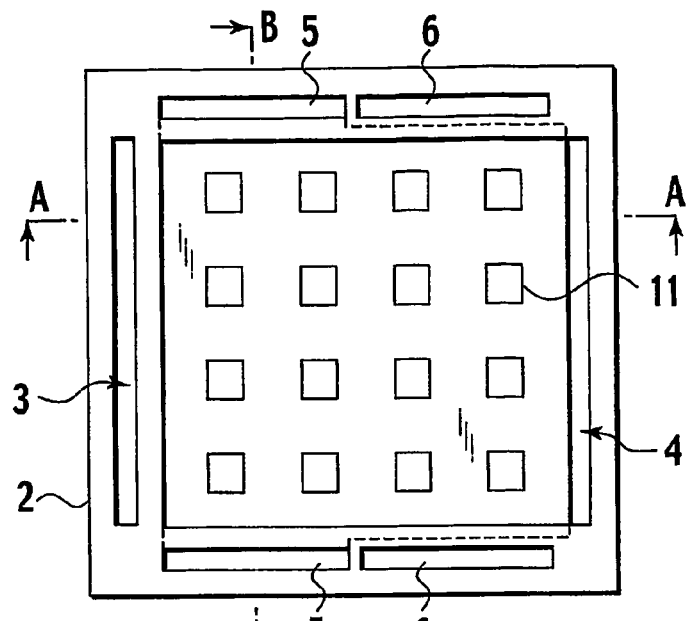
FIG. 2A is a plan view of a separator of the solid oxide fuel cell of the presently filed embodiment on a view where the separator, representatively stacked in the middle in a structure of FIG. 1A, is viewed in a Z-direction.
Figure 2B:
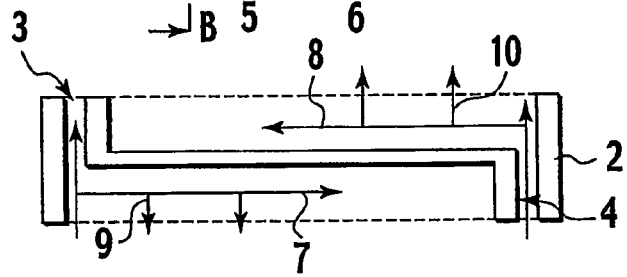
FIG. 2B is a cross section taken on line A-A of FIG. 2A.
Figure 2C:
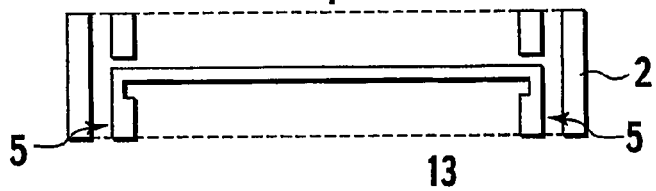
FIG. 2C is a cross section taken on line B-B of FIG. 2A.
Figure 2D:
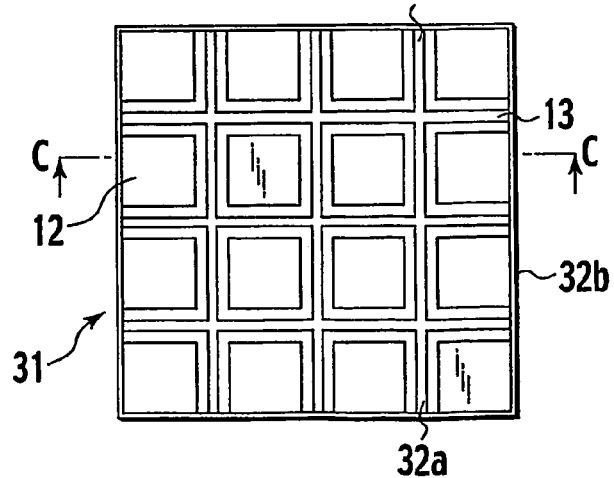
FIG. 2D is a plan view of a current collector layer of the solid oxide fuel cell of the presently filed embodiment on a view where the current collector layer, representatively stacked on a top of the structure in FIG. 1A, is viewed in the Z-direction.
Figure 2E:
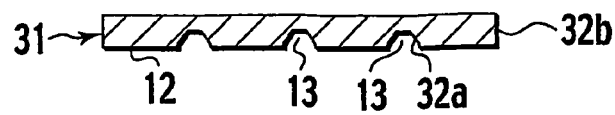
FIG. 2E is a cross section taken on line C-C of FIG. 2D.

FIG. 1A is a schematic cross-sectional view illustrating the solid oxide fuel cell of the presently filed embodiment according the present invention; FIG. 1B is an enlarged view of a part of a structure shown in FIG. 1A and a typical view illustrating gas flow on an oxidizer electrode surface the solid oxide fuel cell of the presently filed embodiment; FIG. 2A is a plan view of a separator, of the solid oxide fuel cell of the presently filed embodiment, which is typically stacked in the middle of the structure shown in FIG. 1A and viewed in a Z-direction; FIG. 2B is a cross-sectional view taken on line A-A in FIG. 2A; FIG. 2C is a cross-sectional view taken on line B-B in FIG. 2A; FIG. 2D is a plan view of a current collector layer, of the solid oxide fuel cell of the presently filed embodiment, which is typically stacked on a top of the structure shown in FIG. 1A and viewed in the Z-direction; and FIG. 2E is a cross-sectional view taken on line C-C of FIG. 2D.

First, as shown in FIGS. 1A and 1B in principle, the solid oxide fuel cell (hereinafter suitably referred to as a stack) 1 is comprised of electric power-generating elements 20, each having both surfaces formed with current collector layers 31 employing porous electric conductors, respectively, and separators 2 which are alternately stacked.

Each electric power-generating element 20 is comprised of an electrolyte layer 21, structurally doubling as a support member, and an oxidizer electrode 22 and a fuel electrode 23 formed on both surfaces of the electrolyte layer 21, with the oxidizer electrode 22 and the fuel electrode 23 being porous. Also, all of the electrolyte layer 21, the oxidizer electrode 22, the fuel electrode 23 and the current collector layers 31 are formed in a flat plate configuration.

In particular, the electric power-generating element 20 includes 8 [mol %] yttria stabilized zirconia (hereinafter abbreviated as 8YSZ) as the electrolyte layer 21, $La_xSr_{1-x}Co_{O3}$ (hereinafter abbreviated as LSC) as the oxidizer electrode 22 formed on the electrolyte layer 21, and NiO-YSZ cermet as the fuel electrode 23 formed on the electrolyte layer 21.

The current collector layers 31 are formed of porous electric conductors, such as metallic fine wire mesh or foamed metal made of heat resistant metals such as stainless steel, which are formed in plate-like configurations, and each has a surface, held in abutment with the electric power-generating element 20, which is formed with recess-like pore stop portions 32a extending through the length and breadth of the surface.

The recess-like pore stop portions 32a serve as oxidized gas exhaust flow channels 13, respectively, under a situation where the current collector layer 31 is placed on the oxidizer electrode 22 and fuel gas exhaust flow channels 14, respectively, under another situation where the current collector layer 31 is placed on the fuel electrode 23.

In forming the oxidizer gas exhaust flow channels 13 or the fuel gas exhaust flow channels 14 on the current collector layer 31, a surface of the current collector layer 31 is partially pushed down in a lattice form or welded in pore stop processing to form the pore stop portions 32a. Further, in stacking the electric power-generating elements 20, the current collector layers 31 and the separators 2 into the stack 1, side surface portions of the current collector layers 31 are similarly subjected to pore stop processing to form pore stop portions 32b with a view to preventing gas leakage from the side surface portions of the current collector layers.

Further, as shown in FIGS. 2A to 2E in principle, each separator 2 is made of heat resistant metal such as stainless steel of ferrite family and, with the stack 1 structured by stacking a plurality of cells, each separator 2 includes an oxidizer gas supply manifold 3 through which oxidizer gas, such as air, is supplied to each layer, a fuel gas supply manifold 4 thorough which fuel gas is supplied, an oxidizer gas exhaust manifold 5 through which gases used in respective layers are exhausted to the stack outside, and a fuel gas exhaust manifold 6.

Formed on an upper surface and a lower surface of each separator 2 are pluralities of protrusions 11 that are formed on four lines by four rows in sixteen pieces, respectively, and recessed portions extending through the length and breadth between adjacent protrusions 11 form a gas supply flow channel 7 or a fuel gas supply flow channel 8.

In each cell forming the stack 1, oxidizer gas such as air is supplied to the gas supply flow channel 7, defined between each separator 2 and the associated current collector layer 31, via the oxidizer gas supply manifold 3 and then flows through oxidizer gas supply branch flow passages 9 formed inside the current collector layer 31 into associated gas blowout ports 12 from which oxidizer gas is blown off to opposing surfaces of the electric power-generating element 20 and associated adjacent regions (first regions A1) of the current collector layer 31.

Then, oxygen in oxidizer gas is ionized on the surface of the oxidizer electrode 22 and entrained into the electric power-generating element 20. Used gas with a lowered oxygen concentration flows over the surface of the electric power-generating element 20 onto the surface of the electric power-generating element 20 at an area, different from the first regions, second regions A2, and adjacent second regions A2 of the current collector layer 31 through which used gas flows into the oxidizer gas exhaust flow channels 13 and is exhausted through the oxidizer gas exhaust manifold 5 to the stack outside. Also, the oxidizer gas exhaust flow channels 13 are subjected to pore stop processing and used gas is able to flow from corner areas CR, each serving as a boundary between the surface of the oxidizer electrode 22 and the oxidizer gas exhaust flow channel 13 into the oxidizer gas exhaust flow channels 13.

Such gas flow similarly occurs on the fuel electrode, and fuel gas such as gas containing hydrogen sequentially flows through the fuel gas supply manifold 4, the fuel gas supply flow channel 8, the fuel gas supply branch flow passages 10 and the gas blowout ports 12 and is then supplied into the electric power-generating element. Fuel gas supplied into the electric power-generating element reacts with oxygen ions on the surface of the fuel electrode 23 and used gas, with a lowered concentration of effective gas components, is exhausted from fuel gas exhaust flow channels 14 to the stack outside via the fuel gas exhaust manifold 6.

The oxidizer gas supply flow channel 7 is branched off into a plurality of oxidizer gas supply branch flow passages 9 in the current collector layer 31 and lower ends of the respective oxidizer gas supply branch flow passages 9 serve as the plural gas blowout ports 12 formed at the lower surface of the current collector layer 31.

Likewise, the fuel gas supply flow channel 8 is branched off into a plurality of fuel gas supply branch flow passages 10 in the current collector layer 31 and upper ends of the respective fuel gas supply branch flow passages 10 serve as the plural gas blowout ports 12 formed at the upper surface of the current collector layer 31.

The gas blowout ports 12, formed on the upper surface or the lower surface of the current collector layer 31, takes a total value of 16 pieces as a result of four lines by four rows on each surface but, of course, the present invention is not limited to such number of gas blowout ports 12, which may be suitably determined depending on dimensions of the separator and the electric power-generating element and gas consumption rates.

Formed between the adjacent gas blowout ports 12 is the oxidizer gas exhaust flow channel 13 or the fuel gas exhaust flow passage 14 that are defined by the pore stop portions 32b by which the current collector layer 31 is formed with recessed configurations.

Incidentally, though not shown in the presently filed embodiment, a pump may be provided for drawing exhaust gases (reacted gases), discharged to the stack outside through the oxidizer gas exhaust manifold 5 or the fuel gas exhaust manifold 6 to allow the stack 1 to operate under reduced pressures in the exhaust gas flow passages. Due to the operation under such reduced pressures in the exhaust gas flow passages, it can be expected that exhaust gases are exhausted at high speeds to provide an improved temperature balance in the whole of the stack while providing an increase in exhaust gas diffusion speeds on reacting sections to enable improvement over the supply of gases to be supplied to the porous electrodes.

As set forth above, since the structure of the presently filed embodiment is arranged such that reaction gases are supplied to the first regions of the electric power-generating element through the plural gas supply branch flow passages, branched off from the gas supply flow channels, while permitting reacted gases to be discharged via the gas exhaust flow channels in fluid communication with the second regions different from the first regions, gases can be supplied to an entire area of the electric power-generating element in a substantially uniform manner without directly mixing with reacted gases.

Further, gases to be supplied are preheated in the gas supply flow channels sections inside the separator and can be supplied to the surface of the electric power-generating element at uniform concentrations.

Furthermore, the current collector layer, using foamed metal or metallic fine wire mesh, plays a role as a resilient buffer, making it possible to alleviate stress being applied to the cell due to stress resulting from the tightening effects during stacking operations and thermal stress caused by an increase or decrease in temperature.

Additionally, in a solid electrolyte fuel cell with no structure of the presently filed embodiment, used gases, contributed to reaction in the vicinity of a center of an electric power-generating element, flow across the electric power-generating element toward an outside thereof, and even in the presence of gases being supplied to a surface of the electric power-generating element at uniform gas concentrations, supplied gases and reacted gases, used in the central part, tend to mix with one another in an outer peripheral area of the electric power-generating element, causing a concentration gradient to occur.

However, with the solid electrolyte fuel cell of the presently filed embodiment, reacted gases are pushed out by fresh gases being supplied to be exhausted from the surface of the electric power-generating element, playing a role as a reacting field, to the outside through the gas exhaust flow channels. For this reason, a macro gas-concentration gradient in the surface of the electric power-generating element is eliminated, enabling the gas concentration in the surface of the electric power-generating element to be homogenized. Thus, gases adequately preheated are supplied to the surface at uniform concentrations and no fresh gases being supplied mix with reacted gases, resulting in elimination of the concentration gradient in the surface of the electric power-generating element.

This enables both the temperature distribution of gases over the surface of the electric power-generating element and the gas concentration distributions to be homogenized with a resultant occurrence of homogenized reaction of gases, resulting in improvement over the temperature distribution on the surface of the electric power-generating element and therefore the temperature distribution on a whole of the stack. This suppresses the occurrence of thermal stresses in the surface of the electric power-generating element and the whole of the stack, enabling to achieve reliability and extended operating life of the stack.

Incidentally, with the presently filed embodiment, although the blowout ports and gas exhaust flow channels are provided both for fuel gas and oxidizer gas, either one of the blowout ports makes it possible to further improve the temperature distribution than that achieved in the related art practice.

Also, while the presently filed embodiment has been described as applied to a rectangular cell structure, the present invention is not limited to such a cell structure and it is, of course, possible to apply the present invention to other cell structures of a flat plate type in a round shape.

SECOND EMBODIMENT

Figure 3A:
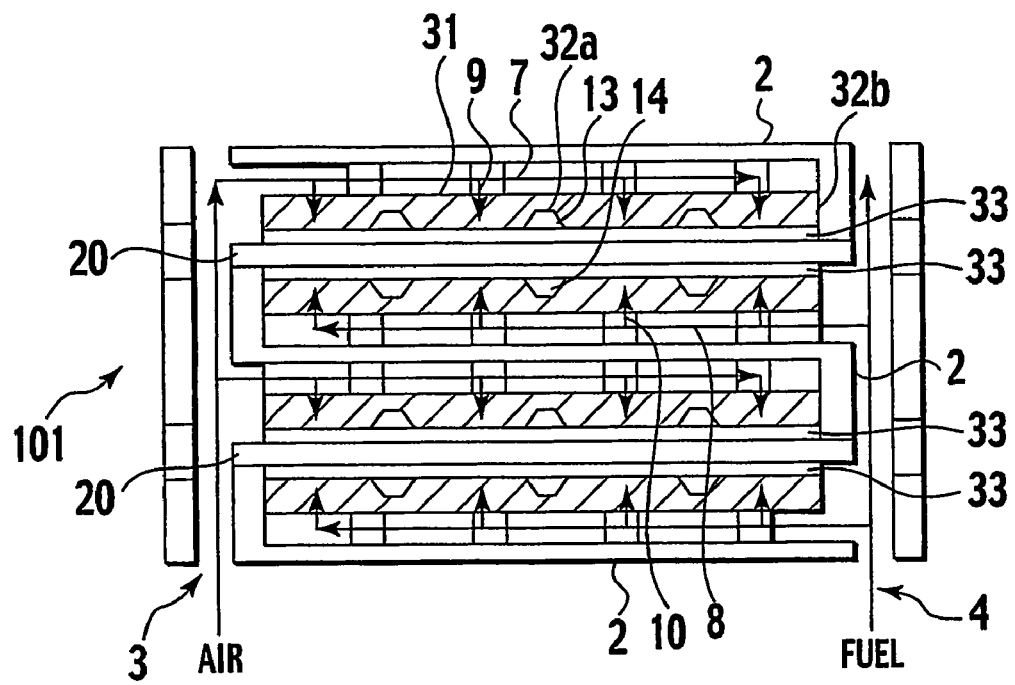
FIG. 3A is a schematic cross-sectional view illustrating a solid oxide fuel cell of a second embodiment according to the present invention.
Figure 3B:
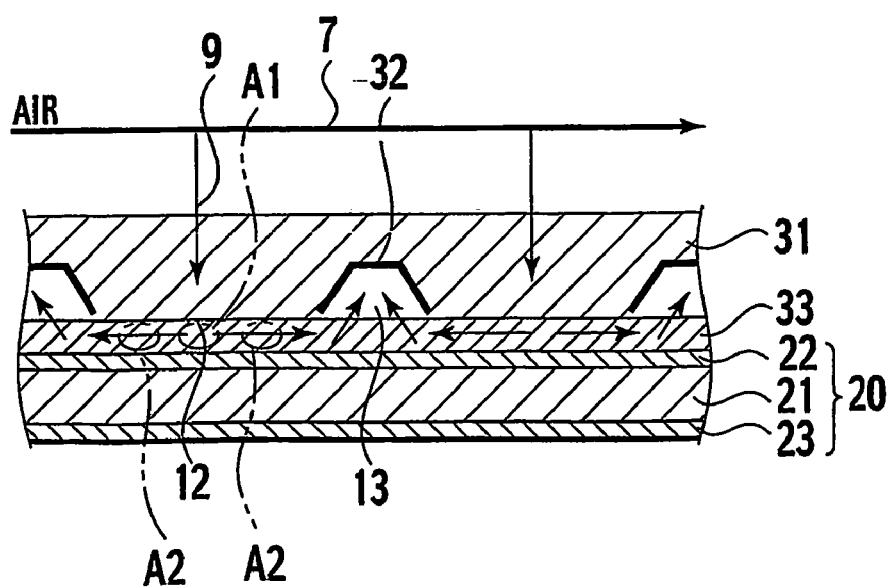
FIG. 3B is an enlarged cross-sectional view of a part shown in FIG. 3A and a typical view illustrating gas flow on an oxidizer electrode surface of the solid oxide fuel cell of the presently filed embodiment.

Next, referring to FIGS. 3A and 3B, a solid oxide fuel cell of a second embodiment according to the present invention is described in detail.

FIG. 3A is a schematic cross-sectional view illustrating the solid oxide fuel cell of the presently filed embodiment, and FIG. 3B is an enlarged cross-sectional view of a part of the structure shown in FIG. 3A and a typical view illustrating a gas flow on an oxidizer electrode surface of the solid oxide fuel cell of the presently filed embodiment.

As shown in FIGS. 3A and 3B, the solid oxide fuel cell of the presently filed embodiment, that is, a stack 101, differs from the structure of the first embodiment in a second current collector layer disposed between the electric power-generating element and the first current collector layer and is similar in other structure to that of the first embodiment.

In particular, with the presently filed embodiment, the current collector layer takes a double layer structure that is comprised of a first current collector layer 31 (corresponding to the current collector layer 31 of the first embodiment) and a second current collector layer 33 between which gas exhaust flow channels 13, 14 are defined.

The first current collector layer 31 is formed of a porous electric conductor, such as metallic fine wire mesh or foamed metal made of heat resistant metal such as stainless steel like in the first embodiment, which is formed in a plate-like configuration and has a surface, facing the electric power-generating element 20 via the second current collector layer 33, which is formed with pore stop portions 32a defined in recessed shapes that extend through the length and breadth of the surface.

The pore stop portions 32a, formed in the recessed shapes, provide the oxidizer gas exhaust flow channels 13 in a structure where the current collector layer 31 is associated with the oxidizer electrode 22 and provides the fuel gas exhaust flow channels 14 in another structure where the current collector layer 31 is associated with the fuel electrode 23.

When forming the oxidizer gas exhaust flow channels 13 or the fuel gas exhaust flow channels 14 on the current collector layer 31, a surface of the current collector layer 31 is partially pushed out in a lattice configuration or welded in part to perform pore stop processing, thereby forming the pore stop portions 32a.

The second current collector layer 33 is formed over an entire surface of the electric power-generating element 20 and porous like the first current collector layer 31. While the second current collector layer 33 is formed of a porous electric conductor, such as metallic fine wire mesh or foamed metal made of heat resistant metal such as stainless steel, which is formed in a plate shape, no pore stop portions in recessed forms are formed.

With the electric power-generating element 20, the current collector layer 31, the current collector layer 33 and the separator 2 stacked to form the stack 101, side surfaces of the first and second current collector layers 31 and 33 are subjected to pore stop processing to form the pore stop portions 32a for the purpose of preventing gas leakage from the side surfaces of the current collector layers.

The gas supply flow channel 7 is branched off into a plurality of oxidizer gas branch flow passages 9 inside the first current collector layer 31 and respective lower ends of the oxidizer gas branch flow passages 9 serve as plural gas blowout ports 12 that are opened at a lower surface of the first current collector layer 31. Likewise, the fuel gas supply flow channel 8 is branched off to a plurality of fuel gas branch flow passages 10 inside the first current collector layer 31 and respective lower ends of the fuel gas branch flow passages 10 serve as plural gas blowout ports 12 that are opened at an upper surface of the first current collector layer 31.

In each cell forming the stack 101, oxidizer gas is supplied to the gas supply flow channel 7 defined between the separator 2 and the first current collector layer 31 via the oxidizer gas supply manifold 3 and then passes through the oxidizer gas branch flow passages 9 inside the first current collector layer 31 into the gas blowout ports 12 from which oxidizer gas is blow out to a region (first region A1) of the second current collector layer 33 whereupon oxidizer gas reaches a surface of the oxidizer electrode 22 of the electric power-generating element 20.

Oxygen in oxidizer gas is then ionized on the surface of the oxidizer electrode 22 of the electric power-generating element 20 to be entrained. Thus, used gas with a lowered oxygen concentration flows from a second region A2, different from the first region A1, inside the second current collector layer 33 to pass through the oxidizer gas exhaust flow channel 13 upon which used gas is exhausted to the stack outside via the oxidizer gas exhaust manifold 5. Such gas flow similarly occurs on the fuel electrode.

As set forth above, due to the structure of the presently filed embodiment wherein in addition to the effects of the first embodiment, the second current collector layers 33 are formed on the surfaces of the electric power-generating element 20, in particular, on overall areas of flat surfaces of the oxidizer electrode 22 and the fuel electrode 23, it becomes possible to achieve a reduction in electrical contact resistance between the current collector layer and the electrode, enabling a further increase in electric power generating efficiency.

THIRD EMBODIMENT

Next, referring to FIGS. 4A to 6B, a solid oxide fuel cell of a third embodiment according to the present invention is described in detail.

Figure 4A:
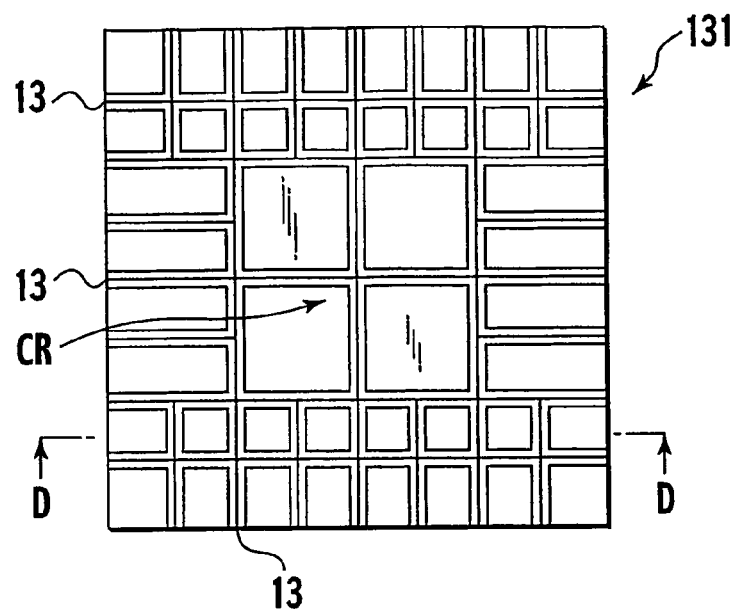
FIG. 4A is a plan view of a current collector layer for a rectangular electric power-generating element of a solid oxide fuel cell of a third embodiment according to the present invention to form a view corresponding to the structure of FIG. 2D.
Figure 4B:
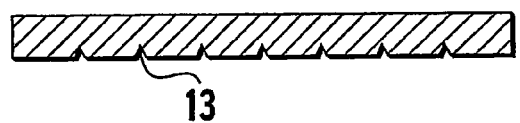
FIG. 4B is a cross section taken on line D-D of FIG. 4A.
Figure 4C:
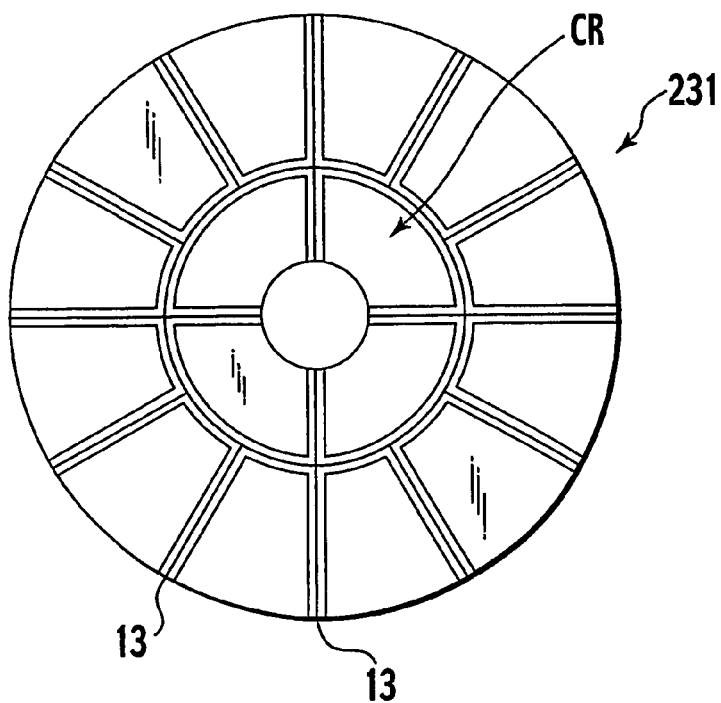
FIG. 4C is a plan view of a current collector layer for a circular electric power-generating element of the solid oxide fuel cell of the presently filed embodiment to form a view corresponding to the structure of FIG. 2D.
Figure 5A:
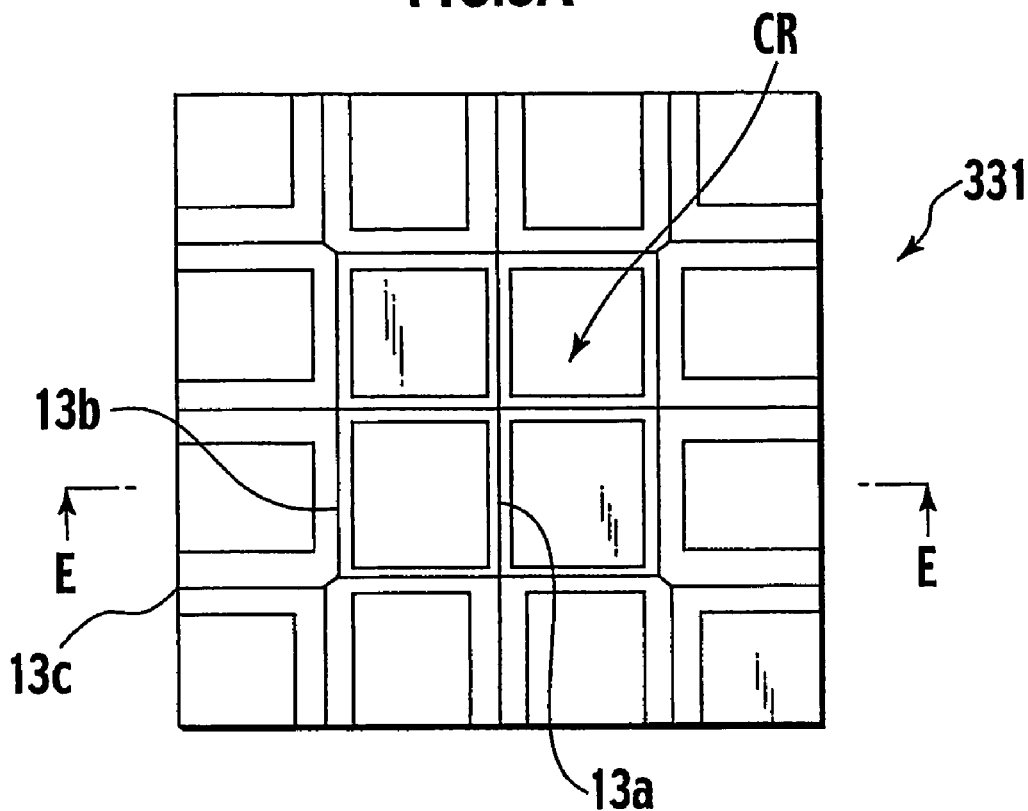
FIG. 5A is a plan view of a current collector layer of a modified form of the solid oxide fuel cell of the presently filed embodiment to form a view corresponding to the structure of FIG. 2D.
Figure 5B:
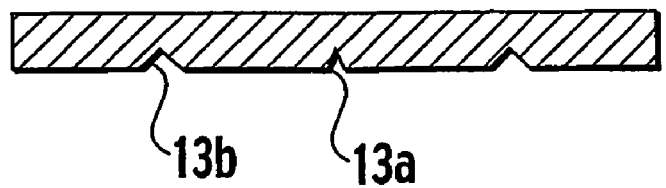
FIG. 5B is a cross section taken on line E-E of FIG. 5A.
Figure 6A:
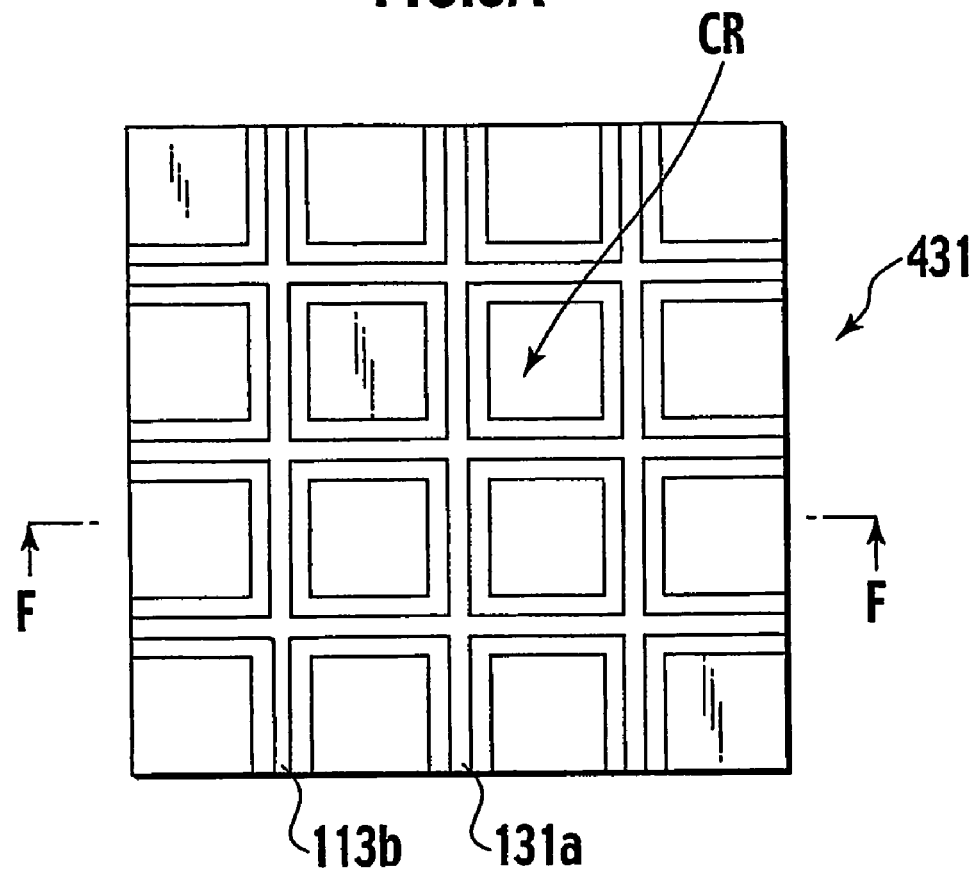
FIG. 6A is a plan view of a current collector layer of another modified form of the solid oxide fuel cell of the presently filed embodiment to form a view corresponding to the structure of FIG. 2D.
Figure 6B:
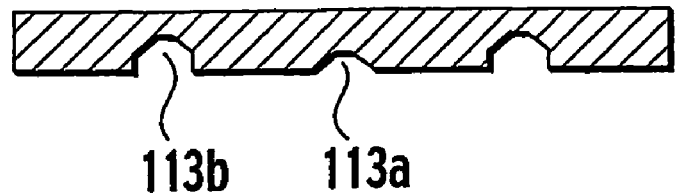
FIG. 6B is a cross section taken on line F-F of FIG. 6A.

FIG. 4A is a plan view illustrating a current collector layer of a square-shaped electric power-generating element of the solid oxide fuel cell of the presently filed embodiment; FIG. 4B is a cross-sectional view taken on line D-D of FIG. 4A; FIG. 4C is a plan view illustrating a current collector layer of a round-shaped electric power-generating element of the solid oxide fuel cell of the presently filed embodiment; FIG. 5A is a plan view illustrating a current collector layer of a solid oxide fuel cell of a modification of the presently filed embodiment; FIG. 5B is a cross-sectional view taken on line E-E of FIG. 5A; FIG. 6A is a plan view of a current collector layer of a solid oxide fuel cell of another modification of the presently filed embodiment; and FIG. 6B is a cross-sectional view taken on line F-F of FIG. 6A.

As shown in FIGS. 4A to 6B, the solid oxide fuel cell of the presently filed embodiment differs from the first embodiment in that gas exhaust flow channels 13 formed in current collector layers 131, 231, 331, 431 have substantially increased cross sectional areas in an area outside a central area CR of an electric power-generating element. Other structure of the presently filed embodiment is identical to that of the first embodiment.

With the solid oxide fuel cell, a tendency occurs wherein exhaust gases, resulting from reaction and blown out to an outside area, and in addition thereto, gases, contributed to reaction inside the electric power-generating element, also flow into flow passages outside the electric power-generating element such that the closer to the outside area, the greater will be the flow rate of gases. Particularly, when using hydrocarbon fuel, marked effects in such a tendency come out. When this takes place, if a width of the flow passage is determined to satisfy only the flow rate of gases at the outside area, the resulting width is over-dimensioned for the inside area with a resultant narrow path through which gases are blown out and reduces the region of the current collector section, causing an increase in current collecting resistance. With such a view in mind, the presently filed embodiment contemplates to substantially increase the cross sectional area of the gas exhaust flow channels in the outside area remoter than the central area CR of the electric power-generating element for thereby addressing the above-described phenomenon.

More particularly, to address such a phenomenon, as shown in FIGS. 4A and 4B, the solid oxide fuel cell with the square-shaped cells, formed in a square shape as viewed on a plane from an upper area or a lower area in FIG. 1A, that is, the stack with the square-shaped cells takes a structure in which a density of, i.e., the number of the gas exhaust flow channels has a larger value in the outside area than that in the inside area.

Further, in FIG. 4C, the solid oxide fuel cell with the round-shaped cells, formed in a round shape as viewed on a plane from the upper area or the lower area in FIG. 1A, that is, the stack with the round-shaped cells takes a structure in which a density of, i.e., the number of the gas exhaust flow channels has a larger value in the outside area than that in the inside area.

With the stack using the round-shaped cells, although the presence of the gas exhaust flow channels disposed in a radial direction enables gases to be more effectively exhausted, a tendency occurs in that the closer to the outside area, the larger will be the rate of exhaust gases flowing into the gas exhaust flow channels with a resultant difficulty in achieving smooth exhaust of gases in the inside area. Thus, the presence of the number of gas exhaust flow channels determined to be larger in the outside area of the electric power-generating element results in effect to smoothly achieve exhaust of gases on the surface of the electric power-generating element in a more uniform manner.

Also, in FIGS. 5A and 5B, the solid oxide fuel cell with square-shaped cells, formed in a square shape as viewed on a plane from the upper area or the lower area in FIG. 1A, that is, a stack with the square-shaped cells takes a structure in which gas exhaust flow channels have larger widths in an outside area than those of the gas exhaust flow channels in an inside area, i.e., in an area closer to an outer peripheral section, for thereby increasing cross sectional areas of the gas flow channels. In particular, the widths of the gas exhaust flow channels take a larger value to increase the cross sectional areas as gas exhaust flow channels 13a, 13b, 13c are placed to be far from an inside of the cell toward an outside thereof in order of a distance.

Moreover, in FIGS. 6A and 6B, a solid oxide fuel cell with square-shaped cells, formed in a square shape as viewed on a plane from the upper area or the lower area in FIG. 1A, that is, a stack with the square-shaped cells takes a structure in which gas exhaust flow channels have greater depth in an outside area than those of the gas exhaust flow channels in an inside area, i.e., in an area closer to an outer peripheral section, for thereby increasing cross sectional areas of the gas flow channels. In particular, the depth of a gas exhaust flow channel 113b in an outside area is greater than that of a gas exhaust flow channel 113a in an inside area of a cell.

FOURTH EMBODIMENT

Figure 7A:
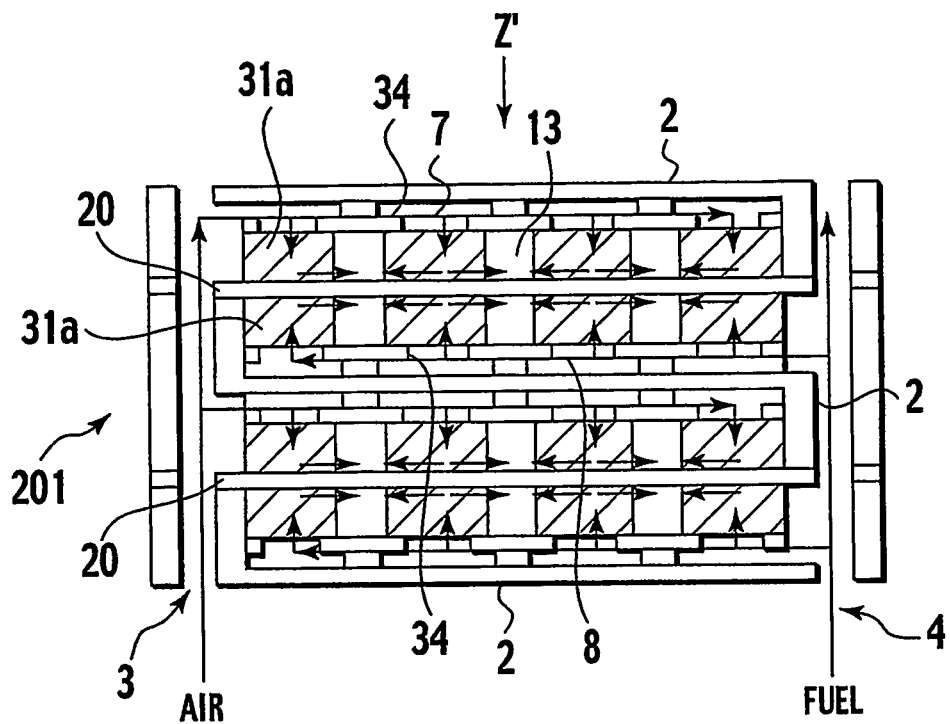
FIG. 7A is a schematic cross-sectional view of a solid oxide fuel cell of a fourth embodiment according to the present invention.
Figure 7B:
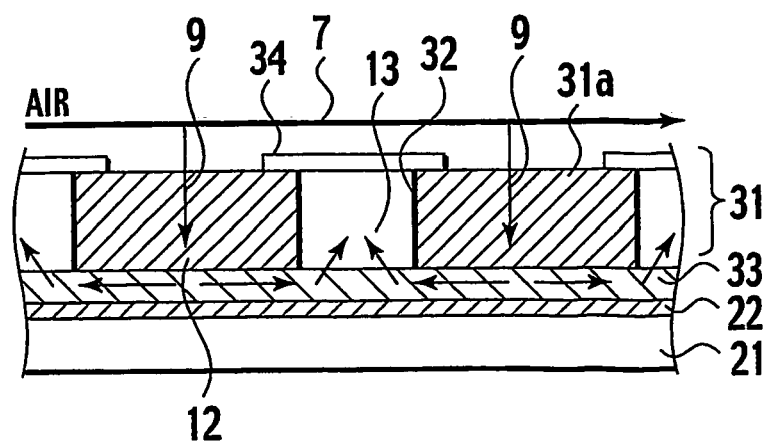
FIG. 7B is an enlarged cross-sectional view of a part shown in FIG. 7A and a typical view illustrating gas flow on an oxidizer electrode surface of the solid oxide fuel cell according to the present invention.

Next, referring to FIGS. 7A to 7B, a solid oxide fuel cell of a fourth embodiment according to the present invention is described in detail.

FIG. 7A is a schematic cross-sectional view illustrating a solid oxide fuel cell of a fourth embodiment according to the present invention, and FIG. 7B is an enlarged cross-sectional view of a part of FIG. 7A and a typical view illustrating a gas flow on a surface of an oxidizer electrode of the solid oxide fuel cell of the presently filed embodiment.

As shown in FIGS. 7A and 7B, a solid oxide fuel cell 201 of the presently filed embodiment differs from the first embodiment in that a current collector layer takes a double layer structure with a first current collector 31 and a second current collector layer 33 and the first current collector layer 31 is comprised of a metal frame 34 and porous electric conductors 31a made of foamed metal or metallic fine wire mesh. Other structure is similar to that of the first embodiment.

In particular, executing pore stop processing on side surfaces of the porous electric conductors 31a of the first current collector layer 31 to form pore stop portions 32 and permitting the porous electric conductors 31a to be joined to the metal frame 34 allows gas exhaust flow channels 13 (gas exhaust flow channels 14 on a fuel electrode) for oxidizer gas to be defined in spaces surrounded between the metal frame 34 and the pore stop portions 32 of the current collector layer 31.

Although the presence of a large diameter size in foamed metal or metallic fine wire mesh results in a degraded precision of a dimension in a thickness direction and a characteristic with extremely fragile and soft properties, the use of the above-described structure makes it possible to extremely ease the fabrication and handling of a current collector layer with a large surface area.

Of course, the presently filed embodiment may also be applied with the structures for increasing the number of flow channels and increasing the cross sectional areas of the flow channels to greater values in the outside area of the cell than those of the flow channels in the inside area.

FIFTH EMBODIMENT

Figure 8A:
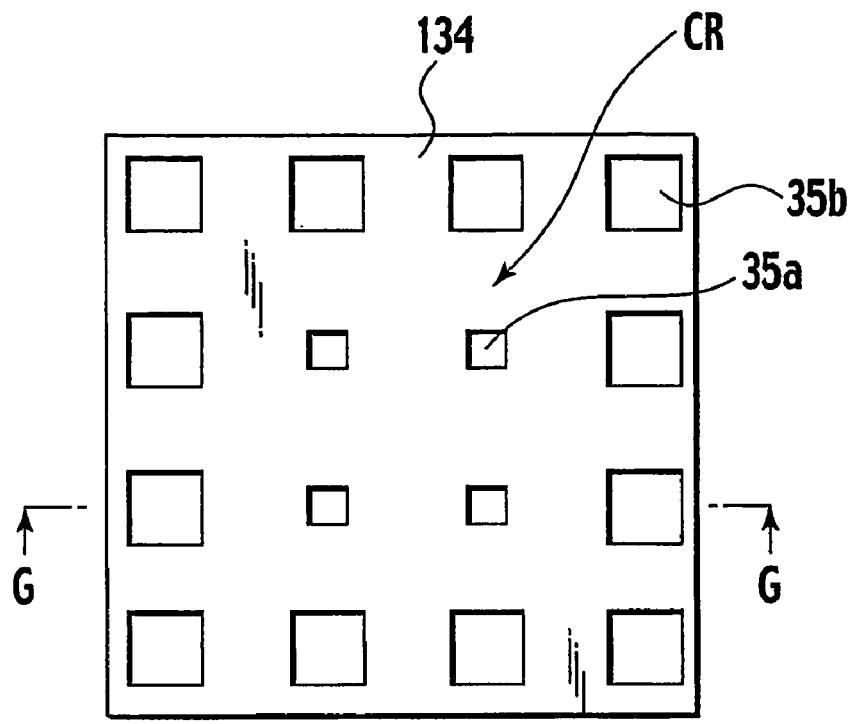
FIG. 8A is a plan view of a current collector layer of a solid oxide fuel cell of a fifth embodiment according to the present invention and a view in which the current collector layer, representatively stacked on a top of the structure shown in FIG. 7A, is viewed in a Z'-direction.
Figure 8B:
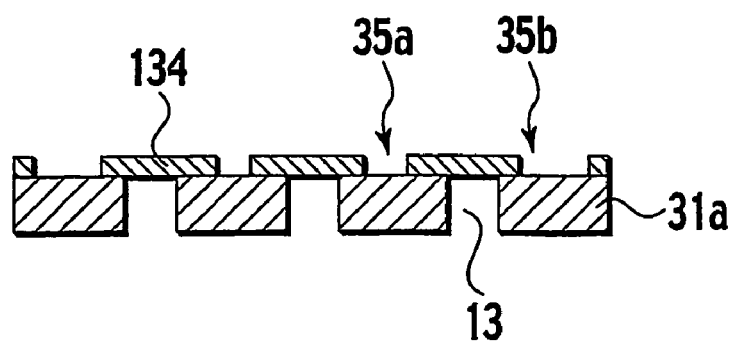
FIG. 8B is a cross section taken on line G-G of FIG. 8A.

Next, referring to FIGS. 8A to 8B, a solid oxide fuel cell of a fifth embodiment according to the present invention is described in detail.

FIG. 8A is a plan view illustrating a current collector layer of the solid oxide fuel cell of the presently filed embodiment and a view of the current collector layer typically laminated on a top of the of the structure shown in FIG. 7A as viewed in a direction Z', and FIG. 8B is a cross-sectional view taken on line G-G in FIG. 8A.

As shown in FIGS. 8A and 8B, the solid oxide fuel cell of the presently filed embodiment differs from the fourth embodiment in that a metal frame 134 has openings dimensioned such that openings 35a in a central area CR are made smaller in size than openings 35b in an outer peripheral area. Other structure is similar to that of the fourth embodiment.

With the presently filed embodiment, due to a structure wherein the openings of the metal frame 134 are dimensioned such that the openings 35a in the central area are small in size while the openings 35b in the outer peripheral area are large, gases are supplied to the inner area of the cell at a low flow rate whereas gases are supplied to the outer peripheral area of the cell at a large flow rate, whereby intensive reaction is able to occur in the outer peripheral area of the electric power-generating element whereas reaction in the central area is limited to a rather less degree.

Thus, the presence of a difference in size of the openings in the metal frame 134 enables the electric power-generating element to be restricted from heat buildup, thereby suppressing adverse affects resulting from thermal stress that would result from heat developed inside the stack due to an increased diameter in structure.

SIXTH EMBODIMENT

Figure 9:
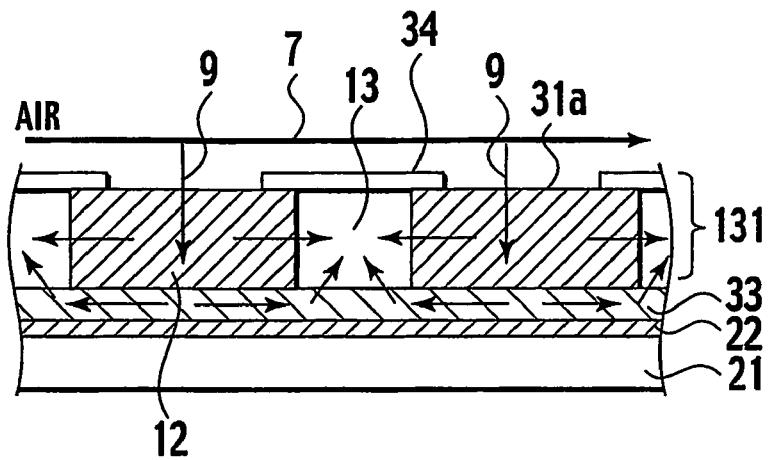
FIG. 9 is an enlarged cross-sectional view of a part of a solid oxide fuel cell of a sixth embodiment according to the present invention and a typical view illustrating gas flow on an associated oxidizer electrode surface.
Figure 10A:
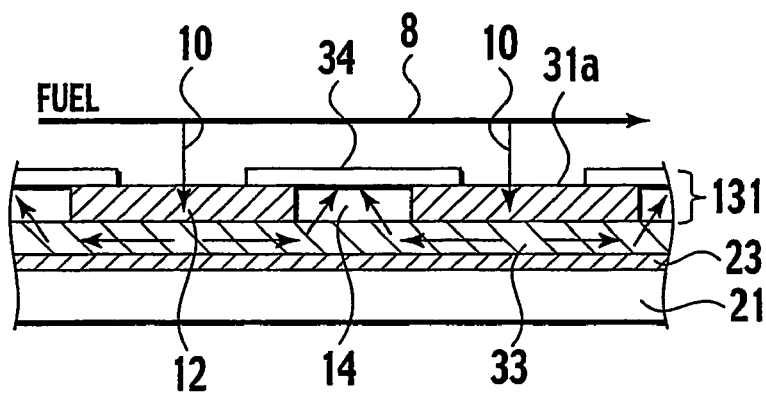
FIG. 10A is an enlarged cross-sectional view of a part of the solid oxide fuel cell of the presently filed embodiment and a typical view illustrating gas flow on an associated fuel electrode surface.
Figure 10B:
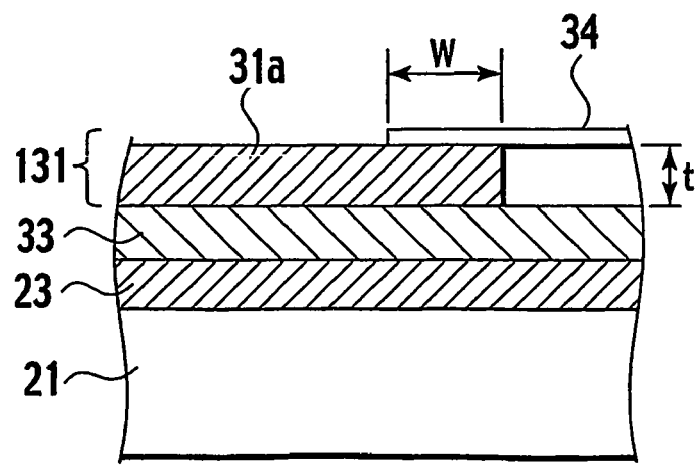
FIG. 10B is an enlarged view of a part shown in FIG. 10A.

Next, referring to FIGS. 9 to 10B, a solid oxide fuel cell of a sixth embodiment according to the present invention is described in detail.

FIG. 9 is an enlarged view of a part of the solid oxide fuel cell of the presently filed embodiment in a typical view illustrating a gas flow on an oxidizer electrode surface; FIG. 10A is an enlarged view of a part of the solid oxide fuel cell of the presently filed embodiment in a typical view illustrating a gas flow on a fuel electrode surface; and FIG. 10B is an enlarged view of a part of the structure shown in FIG. 10A.

As shown in FIGS. 9 to 10B, the solid oxide fuel cell of the presently filed embodiment differs from the fourth embodiment in that no pore stop processing is carried on the side face of the porous electric conductor 31a of the first current collector layer 131. Other structure is similar to that of the fourth embodiment.

In particular, as shown in FIG. 9, with the oxidizer electrode 22 applied with a structure with no pore stop portion, the side face of the first current collector layer 131 has no pore stop portion, thereby enabling oxidizer gas to be supplied to the oxidizer electrode 22 at a further increased flow rate.

This allows heat, which is apt to develop in a central area (an interior of the stack) of the electric power-generating element, to be forcedly carried to the outside by the use of oxidizer gas flowing at a further increased flow rate to achieve the cooling, thereby suppressing adverse affects resulting from thermal stress that would be caused by heat developed inside the stack due to an increased diameter in structure.

Further, as shown in FIGS. 10A and 10B, for the fuel electrode 23 applied with a structure with no pore stop portion, a thickness t of the porous electric conductor 31a of the first current collector layer 131 preferably lies in a value equal to or less than a joining width w (as expressed as $t \leq w$) between the porous electric conductor 31a and the metal frame 34 and the second current collector layer may preferably have a porosity lower than that of the first current collector layer 131, i.e., the porous electric conductor 31a. With such a structure, it becomes possible for fuel gas to be supplied to the fuel electrode surface while minimizing the amount of fuel gas directly leaked to the gas exhaust flow passage as less as possible.

Incidentally, while the presently filed embodiment has been described with reference to the structure applied to the fourth embodiment, it is, of course, possible for the presently filed embodiment to be applied to the first to third and fifth embodiments with similar effects.

SEVENTH EMBODIMENT

Figure 11:
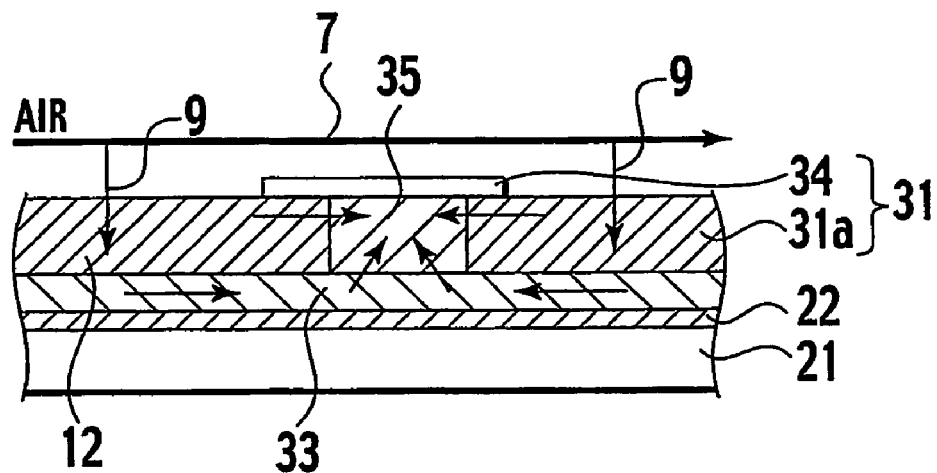
FIG. 11 is an enlarged cross-sectional view of a part of a solid oxide fuel cell of a seventh embodiment according to the present invention and a typical view illustrating gas flow on an associated oxidizer electrode surface.

Next, referring to FIG. 11, a solid oxide fuel cell of a seventh embodiment according to the present invention is described in detail.

FIG. 11 is an enlarged view of a part of the solid oxide fuel cell of the presently filed embodiment in a typical view illustrating a gas flow on an oxidizer electrode surface.

As shown in FIG. 11, the solid oxide fuel cell of the presently filed embodiment differs from the fourth embodiment in a third current collector layer 35 that is disposed in the gas exhaust flow channel, i.e., the oxidizer gas exhaust flow channel and the fuel gas exhaust flow channel, and formed of porous electric conductive material with a higher porosity than that of porous electric conductive material used for the first and second current collector layers 31, 33. Other structure is similar to that of the fourth embodiment.

Thus, with the presently filed embodiment, due to the presence of the third current collector layer 35 made of material whose porosity is higher than that of the other current collector layers, the third current collector layer more preferably serves as a gas exhaust flow passage, enabling further reduction in internal resistance of a fuel cell.

Incidentally, while the presently filed embodiment has been described with reference to the structure applied to the fourth embodiment, it is, of course, possible for the presently filed embodiment to be applied to the first to third, fifth and sixth embodiments with similar effects.

EIGHTH EMBODIMENT

Figure 12:
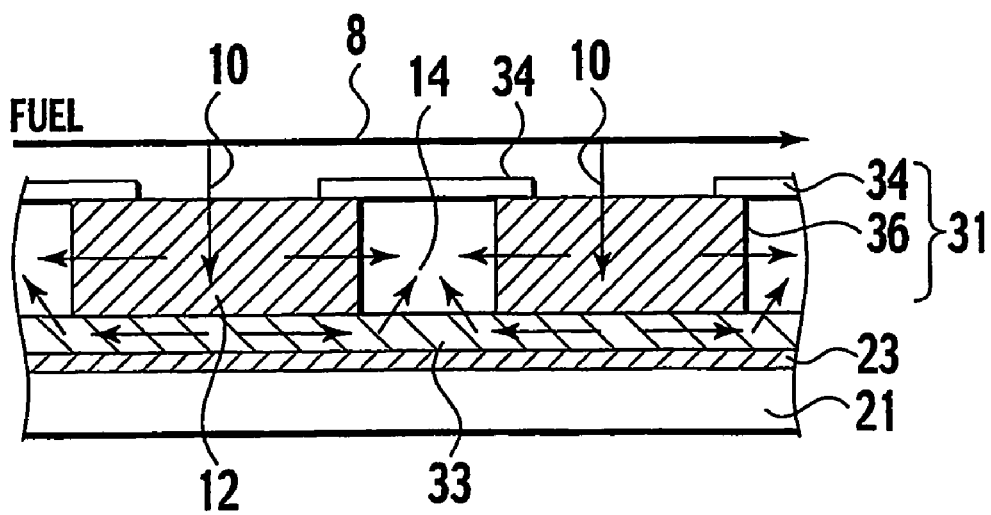
FIG. 12 is an enlarged cross-sectional view of a part of a solid oxide fuel cell of an eighth embodiment according to the present invention and a typical view illustrating gas flow on an associated fuel electrode surface.

Next, referring to FIG. 12, a solid oxide fuel cell of an eighth embodiment according to the present invention is described in detail.

FIG. 12 is an enlarged view of a part of the solid oxide fuel cell of the presently filed embodiment and a typical view illustrating a gas flow on a fuel electrode surface.

As shown in FIG. 12, the solid oxide fuel cell of the presently filed embodiment differs from the fourth embodiment in that a porous electrical conductor forming the first current collector layer 31 formed on the surface of the fuel electrode 23 includes a porous current collector 36 that carries reforming catalyst for fuel gas. Other structure is similar to that of the fourth embodiment.

In particular, examples of reforming catalyst to be carried on the porous current collector 36 may preferably include Platinum (Pt), Palladium (Pd), Rhodium (Rh), Ruthenium (Ru), Iron (Fe), Nickel (Ni) and Copper (Cu). With such reforming catalyst, hydrocarbon in fuel gas is easily reformed into hydrogen and carbon monoxide with a resultant increase in reactivity, thereby enabling a further increase in fuel utilization efficiency.

Thus, with the presently filed embodiment, due to the presence of reforming catalyst carried on the first current collector layer 31, the first current collector layer 31 provides not only current collecting ability but also abilities of preheating gases, supplying gases with uniform concentrations to the electric power-generating element and exhausting used gases and, in addition thereto, makes it possible to reform fuel gas, enabling improvement over power output of the fuel cell in addition to improvement over temperature distribution.

Incidentally, while the presently filed embodiment has been described with reference to the structure applied to the fourth embodiment, it is, of course, possible for the presently filed embodiment to be applied to the first to third and fifth to seventh embodiments with similar effects.

The entire content of a Patent Application No. TOKUGAN 2003-403182 with a filing date of Dec. 2, 2003 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

INDUSTRIAL APPLICABILITY

As set forth above, with a solid oxide fuel cell according to the present invention, since a gas supply channel, through which gas is supplied, and a gas exhaust channel, through which gas is exhausted, are separated on a cell surface, gases can be supplied to the cell surface at uniform concentrations without causing the mixing between supply gas and exhaust gas while reacted gases can be exhausted without adverse affects on a gas concentration on a surrounding area of the cell so as to uniformize the gas concentration on the cell surface for thereby increasing electric power generating efficiency while suppressing the occurrence of thermal stress distribution to enable improvements over reliability and durability of the fuel cell. Therefore, with such a solid oxide fuel cell, an expanded range of application can be expected which involves fuel cell powered automobiles in which a solid oxide fuel cell is adopted.

The invention claimed is:

1. A solid oxide fuel cell comprising:
   a plurality of electric power-generating elements, each including a solid oxide electrolyte and a porous electrode section on the solid oxide electrolyte;
   a plurality of first current collector layers for the electrode sections, respectively;
   a plurality of separators;
   wherein the plurality of electric power-generating elements, the plurality of first current collector layers and the plurality of separators are stacked in a stack direction such that each of the plurality of separators is disposed between and electrically interconnects an adjacent two of the plurality of electric power-generating elements, and each of the plurality of first current collector layers is operatively disposed between one of the plurality of separators and the electrode section of an adjacent one of the plurality of electric power-generating elements, each of the plurality of first current collector layers having a first surface and a second surface that is opposite to the first surface;
   a plurality of gas supply flow channels, each defined between one of the plurality of separators and the first surface of an associated one of the plurality of first current collector layers;
   a plurality of gas supply branch flow passages branched off from one of the plurality of gas supply flow channels, the plurality of gas supply branch flow passages beginning at the first surface and terminating at a plurality of blowout ports, respectively, wherein the plurality of blowout ports are formed within the second surface of the associated one of the plurality of first current collector layers which is disposed adjacent the electrode section of an associated one of the plurality of electric power-generating elements; and
   a plurality of gas exhaust flow channels formed inwardly from the second surface of the associated one of the plurality of first current collector layers, wherein the plurality of gas exhaust flow channels are configured to receive consumed gas that is pushed by a fresh supply of gas out of the blowout ports and to dissipate the consumed gas over an entire area of the second surface of the associated one of the plurality of first current collector layers.

2. The solid oxide fuel cell according to claim 1, wherein the electrode section includes a porous oxidizer electrode formed on one surface of the solid oxide electrolyte to be supplied with oxidizer gas and a porous fuel electrode formed on the other surface of the solid oxide electrolyte to be supplied with fuel gas.

3. The solid oxide fuel cell according to claim 2, wherein the plurality of first current collector layers are disposed adjacent to the oxidizer electrode and the fuel electrode, respectively.

4. The solid oxide fuel cell according to claim 1, wherein the plurality of gas supply branch flow passages are branched off from a gas flow channel and configured to reach the electrode section of the associated one of the plurality of electric power-generating elements via the associated one of the plurality of first current collector layers.

5. The solid oxide fuel cell according to claim 1, wherein the plurality of first current collector layers include porous electric conductors.

6. The solid oxide fuel cell according to claim 1, wherein the gas exhaust flow channels have recesses, subjected to pore stop processing, which reach the electrode section of the associated one of the plurality of electric power-generating elements.

7. The solid oxide fuel cell according to claim 1, wherein second current collector layers, each composed of a porous electric conductor, are placed between the plurality of electric power-generating elements and the plurality of first current collector layers, respectively.

8. The solid oxide fuel cell according to claim 7, wherein the remnant of gas provided to the associated one of the plurality of electric power-generating elements via the plurality of gas supply branch flow passages is exhausted via an associated one of the second current collector layers.

9. The solid oxide fuel cell according to claim 1, wherein the plurality of gas exhaust flow channels are larger in an outer peripheral area than that of the gas exhaust flow channels in a central area of the associated one of the plurality of electric power-generating elements.

10. The solid oxide fuel cell according to claim 1, wherein cross sectional areas of the plurality of gas exhaust flow channels are larger in an outer peripheral area than those of the gas exhaust flow channels in a central area of the associated one of the plurality of electric power-generating elements.

11. The solid oxide fuel cell according to claim 1, wherein the plurality of first current collector layers include a frame section formed with a plurality of openings, and porous electric current conductors correspondingly placed adjacent to the plurality of openings, wherein the gas supply flow channels are branched off from the plurality of openings.

12. The solid oxide fuel cell according to claim 11, wherein the frame section is made of metal and a size of the plurality of openings is greater in an outer peripheral area than that of the openings in a central area of the associated one of the plurality of electric power-generating elements.

13. The solid oxide fuel cell according to claim 11, wherein a width in which the frame section overlaps the porous electric current conductor is greater than a thickness of the porous electric current conductor in the stack direction.

14. The solid oxide fuel cell according to claim 1, wherein third current collector layers, each composed of a porous electric conductor, are placed in the plurality of gas exhaust flow channels, respectively, and the third current collector layers have a porosity greater than that of the plurality of first current collector layers.

15. The solid oxide fuel cell according to claim 7, wherein third current collector layers, each composed of a porous electric conductor, are placed in the plurality of gas exhaust flow channels, respectively, and the third current collector layers have a porosity greater than that of the second current collector layers.

16. The solid oxide fuel cell according to claim 2, wherein the plurality of first current collector layers each facing the fuel electrode carry fuel reforming catalyst.

17. The solid oxide fuel cell according to claim 1, wherein the plurality of gas exhaust flow channels divide the second surface of the associated one first current collector layer into a plurality of sub-areas comprising a first group of sub-areas disposed on the outskirts of the associated one first current collector layer and opening at the periphery of the associated one first current collector layer and a second group of sub-areas distant from the periphery of the associated one first current collector layer, and wherein the gas exhaust flow channels surround and define the sub-areas of the second group, respectively, and wherein the plurality of blowout ports are disposed within the plurality of sub-areas, respectively.

18. The solid oxide fuel cell according to claim 17, wherein the plurality of gas supply branch flow passages run through the associated one first current collector layer to terminate at the plurality of blowout ports, respectively, to blow gas out of each of the plurality of sub-areas.

* * * * *